May 12, 1964  W. S. POWERS, JR  3,132,933
CERAMIC MOLDING MACHINES

Filed April 14, 1960  2 Sheets-Sheet 1

INVENTOR.
WHITNEY S. POWERS, JR.
BY
Clinton S. Janes
ATTORNEY

May 12, 1964   W. S. POWERS, JR   3,132,933
CERAMIC MOLDING MACHINES

Filed April 14, 1960   2 Sheets-Sheet 2

INVENTOR.
WHITNEY S. POWERS, JR.
BY
ATTORNEY ns of FIG. 2, the mold-holding arms being
United States Patent Office 3,132,933
Patented May 12, 1964

3,132,933
CERAMIC MOLDING MACHINES
Whitney S. Powers, Jr., Pine City, N.Y., assignor to Maul
Bros. Inc., Millville, N.J., a corporation of New Jersey
Filed Apr. 14, 1960, Ser. No. 22,294
8 Claims. (Cl. 65—357)

The present invention relates to improvements in ceramic molding machines and more particularly to the means for mounting and actuating the mold holding and operating mechanism.

The device here disclosed is an improvement over the present commercial forms of molding machines such as disclosed in the patent to Ingle, 1,911,119, patented May 23, 1933.

It is an object of the present invention to provide a novel mold operating mechanism of the above character which is simple and economical in construction, efficient and uniform in operation, and which constitutes a self-contained unit including its own operating motor.

It is a further object to provide such a device which is readily removed from and replaced on the molding machine as a unit, whereby it can be serviced, adjusted and checked for proper operation apart from such molding machine; while said machine is maintained in operation by means of a similar spare unit.

It is another object to provide such a device comprising a pair of mold-holding arms pivoted on a common hinge post, and unitary means for swinging such arms from and toward each other to open and close the mold, incorporating means for positively coordinating the movement of said arms and means for preventing deflection of the hinge post when the closing forces are applied.

It is another object to provide such a device which accomplishes more accurate centering of the blank or mold with respect to the associated mechanisms, and greater gripping forces of the mold-holding means, than heretofore provided; thus reducing or eliminating checks or bad seams in the product.

It is another object to provide such a device in which the means for coordinating the movement of the mold carrying arms also functions to insure uniform, accurate centering of the halves of the mold with relation to the associated feeding and work handling mechanisms.

It is another object to provide such a device which is so designed as to increase the latitude of its operation and applicability by making it possible to increase the radius and angle of operation of the mold carrying arms without interfering with the adjacent elements of the machine.

It is another object to provide such a device in which a single reciprocatory motor is arranged to operate both mold holding arms, said motor being mounted with freedom for floating movement whereby the forces applied to said arms are exactly balanced and the reciprocating parts of the motor are completely free from lateral deflecting forces.

It is another object to provide such a device in which the bearings for the operating shaft and said coordinating means are completely enclosed and operate in an oil bath.

Further objects and advantages will be apparent from the following description taken in connection with the accompanying drawings in which.

Figure 1:
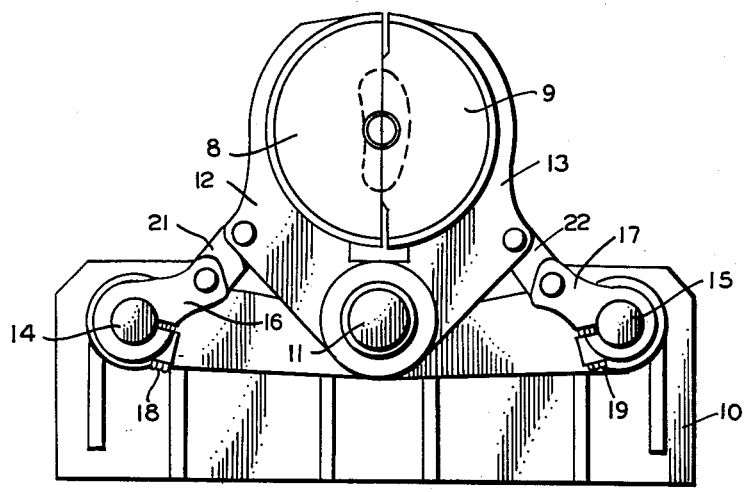
FIG. 1 is a top plan view of a preferred embodiment of the invention with the tie plate for supporting the ends of the hinge post and actuating shafts removed for the sake of clarity.
Figure 2:
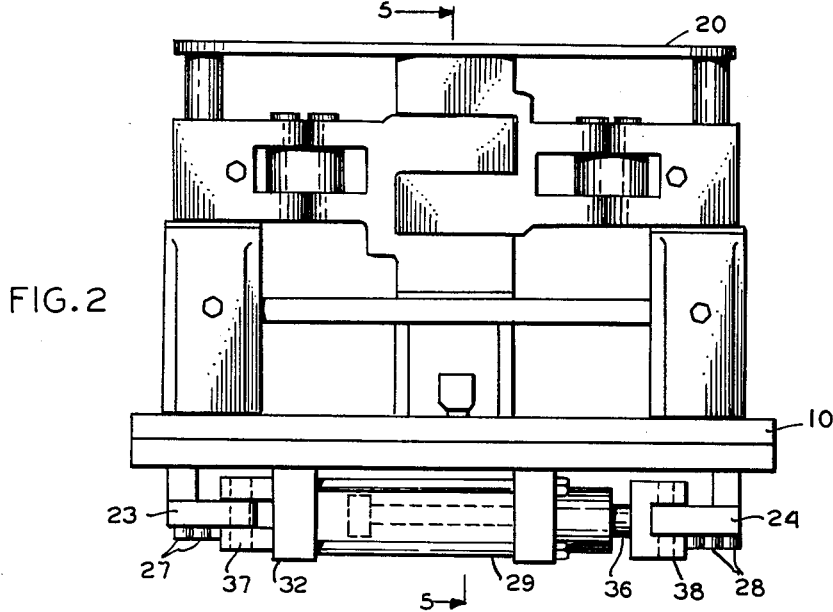
FIG. 2 is an elevation of the same.
Figure 3:
FIG. 3 is a detail plan view of the tie plate.

In FIGS. 1 and 2 of the drawing there is illustrated a frame 10 on which a hinge post 11 is rigidly mounted in any suitable manner. A pair of arms 12, 13 holding the halves 8, 9 of a mold are pivotally mounted on the hinge post 11 for movement toward and from each other to grasp and release the work to be molded.

Means for simultaneously actuating said arms is provided comprising a pair of operating shafts 14, 15 journalled in said frame 10 parallel to the hinge post 11 and having cranks 16, 17 rigidly mounted on the upper ends thereof respectively with provision for rotary adjustment as indicated at 18, 19. Links 21, 22 are pivoted at their ends to the cranks 16, 17 and arms 12, 13 respectively so as to form toggle connections for actuating said arms. In FIG. 1 the arms 12, 13 are shown in their fully closed position with the toggle linkages approaching their dead center positions. Opening of the arms is accomplished by simultaneous rotation of the actuating shaft 14 and crank 16 in the clockwise direction, and similar counter clockwise rotation of shaft 15 and crank 17.

A tie plate 20 is preferably provided, having a slip fit on the upper ends of the hinge post and actuating shafts, in order to assist in preventing deflection of said parts when the closing forces are applied.

Figure 4:
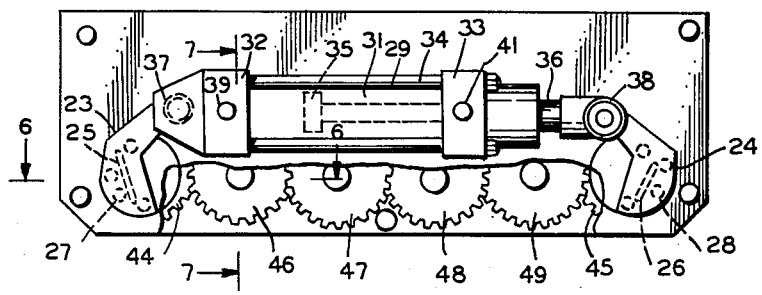
FIG. 4 is a bottom view partly broken away in order to show the coordinating gearing.
Figure 6:
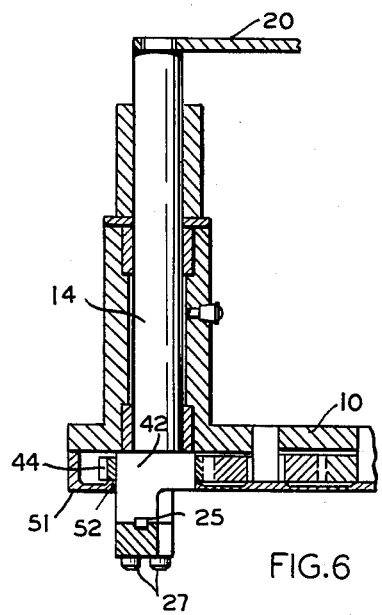
FIG. 6 is a vertical sectional detail taken substantially on the line 6—6 of FIG. 4.

The actuating shafts 14, 15 extend below the frame 10 as shown in FIGS. 2, 4 and 6, and crank members 23, 24 are fixedly mounted on said shafts 14, 15 respectively as by means of keys 25, 26 and studs 27, 28.

A reciprocatory motor indicated generally by the numeral 29 is provided for actuating said cranks 23, 24 in opposite directions. As best shown in FIGS. 2 and 4, said motor comprises a cylinder 31 having heads 32, 33 rigidly fixed thereon as by means of tie bolts 34, and a piston 35 mounted on a piston rod 36 slidably mounted in the cylinder with suitable packing means to prevent passage of actuating fluid. The cylinder head 32 is mounted on and pivotally connected to the crank 23 as indicated at 37 (FIG. 2). Piston rod 36 is likewise mounted on and pivotally connected to the crank 24 as indicated at 38. Nipples 39, 41 are provided on the cylinder heads 32, 33 respectively for attachment to flexible conduits, not illustrated, for supplying and exhausting fluid under pressure in conventional manner for energizing the motor 29 to actuate the mechanism.

Figure 7:
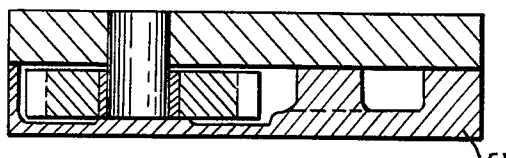
FIG. 7 is a sectional detail of the coordinating gearing and its oil bath taken substantially on the line 7—7 of FIG. 4.

Means for accurately coordinating the opposite rotary movement of the actuating shafts 14, 15 is provided, here shown in the form of a spur gear train. The shafts 14, 15 are enlarged similarly adjacent their lower ends, the enlargement of shaft 14 being shown at 42 in FIG. 6, and spur gears 44, 45 (FIG. 4) are formed thereon or rigidly affixed thereto. A train of idler gears 46, 47, 48, 49 are journaled in the frame 10 as shown in FIGS. 4 and 6, and connect the gears 44, 45 for simultaneous rotation in opposite directions. A housing plate member 51 (FIGS. 6 and 7) is arranged to enclose the gear train to provide an oil bath therefor, suitable packing means 52 being provided for preventing escape of lubricant around the actuating parts.

Figure 5:
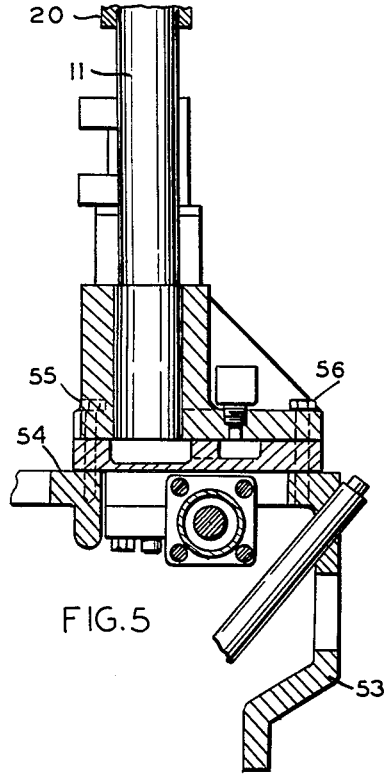
FIG. 5 is a vertical sectional view taken substantially on the line 5—5 of FIG. 2, the mold-holding arms being omitted, showing the method of mounting the unit on the main frame of the molding machine.

The method of detachably mounting applicant's device on the molding machine is illustrated in FIG. 5. As above shown, number 53 indicates a portion of the main frame or base of the molding machine corresponding to the main frame or base 9 best shown in FIG. 5 of the Ingle patent above referred to. Applicant's frame 10 is mounted on the upper flat surface 54 of the base 53 and rigidly attached thereto by suitable means such as cap screws 55, 56. Removal of the unit is therefore readily accomplished by merely releasing the cap screws and lifting the unit from the base 53 of the machine.

In operation, the motor 29 is actuated either hydraulically or by compressed air by means of the conventional controlling mechanism as disclosed in the patent to Ingle supra. When fluid is admitted through the nipple 41 on cylinder head 33, the piston 35 moves inwardly within cylinder 31, causing the actuating shafts 14, 15 to rotate in opposite directions to the positions illustrated in FIG. 1 where the mold carrying arms 12, 13 are in their closed position. Admission of actuating fluid through the nipple 39 of cylinder head 32, and concomitant exhaust through the nipple 41 causes the arms 12, 13 to swing away from each other to release the work in the usual manner.

Although but one form of the invention has been shown and described in detail, it will be understood that changes may be made in the precise form and arrangement of the parts without departing from the spirit of the invention as defined in the accompanying claims.

I claim:

1. In a ceramic molding machine, in combination with a split mold,
    means for closing and opening the mold including a pair of arms supporting the halves of the mold,
    means for pivotally supporting said arms, and
    means for simultaneously swinging the arms toward and from each other including a pair of actuating shafts,
    a crank and linkage system connecting each shaft to one of said arms, and
    mean sfor oscillating said shafts including a unitary motor having two oppositely reciprocable elements, means for actuating said elements in opposite directions to each other,
    means for operatively connecting one of said elements to each of said shafts, and
    means independent of said motor, and external to the operative connections from the motor to said arms, for positively connecting said shafts with each other, for equal and opposite angular movement.

2. The combination set forth in claim 1 including further a frame for supporting and containing the elements of the combination,
    a common hinge post rigidly mounted on said bearing frame forming the pivotal support for said arms,
    said shafts and hinge post projecting beyond said cranks and arms, and
    a rigid tie-plate having openings slidably receiving the projecting ends of the hinge post and actuating shafts to prevent relative displacement thereof.

3. A unitary mold holding mechanism for ceramic molding machines comprising a frame adapted to be detachably mounted on a molding machine,
    a pair of mold-holding arms pivoted on the frame for movement toward and from each other for grasping and releasing a mold,
    a pair of actuating shafts rotatably mounted in the frame parallel to the pivot of said arms,
    means including toggle linkage for connecting each shaft to operate one of the arms,
    means including a unitary motor comprising a cylinder and a piston, means for actuating said piston and cylinder in opposite directions to each other, means connecting said cylinder to one of said shafts, and the piston to the other of said shafts, for simultaneously oscillating both said shafts in opposite directions, and
    mean independent of said motor and external to the operative connections from the motor to said shafts for positively connecting said shafts with each other for equal and opposite angular movement.

4. The combination set forth in claim 1 including further a frame for supporting and containing the elements of the combination to provide a self-contained structural unit, and means for detachably mounting said unit on the molding machine.

5. The combination set forth in claim 1 in which said last-mentioned means comprises constantly meshed toothed gearing.

6. The combination set forth in claim 5 further including means for enclosing said gearing and the adjacent portions of said shafts to provide an oil bath for said elements.

7. The combination set forth in claim 1 in which said elements of the motor are supported on the shafts by said connecting means, whereby the motor floats freely between said shafts.

8. A device as set forth in claim 3 in which said synchronizing means comprises gearing positively connecting said operating shafts for equal and opposite rotary movement.

References Cited in the file of this patent

UNITED STATES PATENTS

| | | |
|---|---|---|
| 767,935 | Good | Aug. 16, 1908 |
| 2,702,444 | Rowe | Feb. 22, 1955 |
| 2,748,536 | Allen | June 5, 1956 |